United States Patent
Berntsson

(10) Patent No.: US 12,420,770 B2
(45) Date of Patent: Sep. 23, 2025

(54) METHOD OF POWER MANAGEMENT AND A POWER SYSTEM OF AN ELECTRICALLY POWERED VEHICLE

(71) Applicant: VOLVO TRUCK CORPORATION, Gothenburg (SE)

(72) Inventor: Simon Berntsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 592 days.

(21) Appl. No.: 17/363,946

(22) Filed: Jun. 30, 2021

(65) Prior Publication Data

US 2022/0001848 A1 Jan. 6, 2022

(30) Foreign Application Priority Data

Jul. 1, 2020 (EP) .................................... 20183445

(51) Int. Cl.
*B60W 10/26* (2006.01)
*B60L 1/00* (2006.01)
*B60R 16/033* (2006.01)

(52) U.S. Cl.
CPC ............... *B60W 10/26* (2013.01); *B60L 1/00* (2013.01); *B60R 16/033* (2013.01)

(58) Field of Classification Search
CPC ....... B60W 10/26; B60L 1/00; B60L 15/2045; B60L 2200/36; B60L 2240/642; B60L 2240/662; B60L 50/60; B60L 1/02; B60L 58/10; B60L 58/30; B60L 58/40; B60L 15/20; B60R 16/033; Y02T 10/64; Y02T 10/70; Y02T 10/72; Y02T 90/16; Y02T 90/40
See application file for complete search history.

(56) References Cited

U.S. PATENT DOCUMENTS

| 4,488,410 A | * | 12/1984 | Seiderman | .......... | F16H 59/0217 |
| | | | | | 62/133 |
| 11,142,151 B2 | * | 10/2021 | Cox | .................. | B60R 16/03 |
| 11,602,999 B1 | * | 3/2023 | Flatland | .............. | G05D 1/0217 |

(Continued)

FOREIGN PATENT DOCUMENTS

| KR | 20020007688 A | * | 7/2000 | .......... | B60H 1/3208 |
| WO | 2012155927 A1 | | 11/2012 | | |

OTHER PUBLICATIONS

European Search Report dated Oct. 22, 2020, in corresponding European Patent Application No. 20183445.4, 7 pages.

*Primary Examiner* — Daniel L Greene
*Assistant Examiner* — Henry R Hinton
(74) *Attorney, Agent, or Firm* — Venable LLP; Jeffri A. Kaminski

(57) ABSTRACT

A method for power management of an electrically powered vehicle, wherein at least two loads, including a first load and at least one second load, are by default powered by an electric energy storage system of the vehicle according to a first prioritization strategy determining how power is distributed among the at least two loads. The method comprises detecting that a pre-defined operating condition applies, and in response to said detection, activating a second prioritization strategy, wherein, according to the second prioritization strategy, power distribution to the first load is prioritized over power distribution to the at least one second load.

10 Claims, 3 Drawing Sheets

(56) References Cited

U.S. PATENT DOCUMENTS

| | | | |
|---|---|---|---|
| 2004/0124703 A1* | 7/2004 | Tani | B60R 16/0315 307/10.1 |
| 2009/0152942 A1* | 6/2009 | Waite | H02J 1/14 307/9.1 |
| 2015/0066292 A1* | 3/2015 | Macfarlane | B60W 30/1882 701/36 |
| 2016/0016484 A1* | 1/2016 | Igarashi | B60W 10/08 701/22 |
| 2016/0159220 A1* | 6/2016 | Enomoto | B60L 1/006 701/22 |
| 2016/0325729 A1 | 11/2016 | Askerdal et al. | |
| 2017/0334264 A1* | 11/2017 | Huaulme | B60H 1/00428 |
| 2019/0283541 A1* | 9/2019 | Adetola | B60H 1/3204 |
| 2020/0148142 A1* | 5/2020 | Pierce | B60L 53/20 |
| 2020/0180531 A1* | 6/2020 | Han | B60R 16/033 |
| 2021/0138983 A1* | 5/2021 | Sato | H01M 10/48 |

* cited by examiner

METHOD OF POWER MANAGEMENT AND A POWER SYSTEM OF AN ELECTRICALLY POWERED VEHICLE

TECHNICAL FIELD

The present disclosure relates to a method of power management, to a control unit and to a power system of an electrically powered vehicle. The disclosure also relates to a control unit and a computer program for causing the control unit to perform the steps of the method. It also relates to an electrically powered vehicle comprising the control unit and/or the power system.

BACKGROUND

The rapid development of electrically powered vehicles encounters numerous challenges that need to be overcome in order to make electrically powered vehicles competitive as compared to conventional, fossil fuel-propelled vehicles.

An electrically powered vehicle may have multiple electrical sub-systems connected to a traction voltage system, such as directly to the traction voltage bus of the vehicle, which means that there are multiple consumers sharing the traction power—in addition to the electrical propulsion system itself. Since an energy storage system can only deliver a limited amount of power at a given time it is necessary to plan power consumption so that critical systems, such as the propulsion system, do not fail because too much power is distributed to non-critical systems. Correct distribution of power to the propulsion system is especially important in situations where the propulsion system has an increased power demand, such as in transient conditions, which may be exemplified by hill starts, gear shifts and/or cold weather.

WO2012155927 relates to an energy management system (EMS) of a vehicle having a combustion engine, wherein flow of energy is controlled by pricing rules. The price of energy depends on momentary supply. Pricing is low when the combustion engine is running with a high efficiency or during braking. The price is high when the combustion engine is running with a low efficiency. Different energy consumers have individual price limits, above which the system will not purchase any more energy.

While present solutions work well in some situations, and for combustion engines, there is still room for improvements relating to power management strategies of electrically powered vehicles.

SUMMARY

An object of the present disclosure is therefore to improve power management in an electrically powered vehicle.

The object is achieved according to first aspect of the present disclosure by a method for power management of an electrically powered vehicle according to claim 1. At least two electrical loads, including a first load, such as in the form of an electrical propulsion system of the vehicle, and at least one second load, such as at least one auxiliary load, a thermal system, and/or a power take-off of the vehicle, are by default powered by an electric energy storage system of the vehicle according to a first prioritization strategy determining how power is distributed among the at least two loads. The method comprises detecting that a pre-defined operating condition applies, and in response to said detection, activating a second prioritization strategy. According to the second prioritization strategy, power distribution to the first load is prioritized over power distribution to the at least one second load.

In the second prioritization strategy, the first electrical load is prioritized for power distribution over other loads when the prioritized load has an increased power demand. The power management system is simple, robust and improves reliability of the prioritized load. Yet, non-prioritized loads are maintained at a working level of power.

According to a further aspect of the present disclosure, the pre-defined operating condition is a condition in which the first load has an increased power demand, such as a transient condition, e.g. a hill start, a gearshift and/or cold weather.

According to a further aspect of the present disclosure the second prioritization strategy comprises limiting distributed power to the at least one second load to a set-point for power distribution to said at least one second load.

The first load may be an electrical propulsion system of the vehicle. Under certain operating conditions, the electrical propulsion system may have an increased power demand, requiring more power than delivered by the electrical storage system during normal running of the vehicle. To assure that enough power is available to the first load, the second prioritization strategy is activated. The first prioritization strategy is sufficient during normal running conditions.

Conditions of increased power demand of the propulsion system may arise in various situations and may depend on a number of factors. The vehicle may for instance need to start moving in an upwards slope, i.e. a hill start. Cold weather may also increase power demand. A further example of conditions requiring more power is gearshifts, especially in combination with hill starts and cold weather. A low state of charge of the electrical storage system may also result in the propulsion system demanding more power than currently delivered by the electrical storage system. Such operating conditions of increased power demand, where the first load demands more power than currently available, are usually known and may be pre-defined and detectable by a control unit of the vehicle in order to regulate power distribution from the electrical storage system such that power distributed to first load is prioritized over power distribution to the second load.

The control unit may operate by threshold values. For instance, the control unit may, e.g. via sensors, detect that an inclination of a slope is greater than a pre-determined value. If the vehicle starts in such a slope, or needs to change gear at low speed, the power demand of the propulsion system may be increased and the control unit detects a pre-defined operating condition, causing activation of the second prioritization strategy.

The at least one second load may be may be exemplified by at least one auxiliary load, e.g. a thermal system, and/or a power take-off of the vehicle. Such a second load is an electrical load which may be connected to a traction voltage bus of the vehicle. A plurality of second loads may be connected and consume varying amounts of power. There may be thermal systems for heating or cooling of a cab or of a cargo hold of the vehicle. Power take-offs, such as electrical apparatuses, machines and tools may also be connected. Power distribution to these systems, i.e. to the second loads, may be de-rated under the pre-defined operating conditions when the first load has an increased power demand.

De-rating is herein defined as limiting distributed power to the second load(s) in a pre-determined manner when a pre-defined operating condition applies, such that more_ power is available for the first load. In other words, power distribution to the first load in the second prioritization strategy is prioritized under such pre-defined operating conditions. "De-rating" and "limiting distributed power" may be used interchangeable in the present disclosure.

According to a further aspect of the present disclosure the method comprises detecting whether the at least one second load is provided with a pre-determined set-point for power distribution, and if a pre-determined set-point is detected, limiting distributed power to the at least one second load to the pre-determined set-point.

The second load may be a device that requires a certain power to operate correctly. If operation of the device is necessary to avoid damaging the device or to avoid irreparable interruption of an ongoing process, the device may be installed in the vehicle with a pre-determined set-point for power distribution such that the device is allowed to keep running during the second prioritization strategy, but at a limited level of power consumption. When a pre-determined set-point of a second load is detected, the distributed power to that second load is limited to that set-point. Accordingly, such a second load is not allowed to consume more power than the pre-defined set-point.

According to a further aspect of the present disclosure, if a pre-determined set-point is not detected, the disclosed method sets a dynamic set-point for maximum power distribution for the at least one second load in dependence of the detected pre-defined operating condition, and limiting maximum distributed power to the second load to the dynamic set-point.

Some systems, i.e. second loads, perform non-critical operations, or they are not sensitive to temporary interruptions. Responses to temporary interruptions of such systems may for instance be slow compared to the duration of an interruption caused by activation of the second prioritization strategy. An example of such a system is an air conditioning system of the cab of the vehicle. Thus, the dynamic set-point may be set for systems lacking a pre-defined set-point, in accordance with the detected operating conditions. In harsh conditions, insensitive systems and operations may be de-rated/limited to zero maximum power, i.e. they may be shut down for the duration of the second prioritization strategy. In less harsh conditions, such systems may be allowed to keep running, but at a limited maximum level of power consumption, as dictated by the control unit according to the detected pre-defined operating condition.

According to a further aspect of the present disclosure, subsequently to activating the second prioritization strategy, the method detects whether a pre-determined end condition applies.

The second prioritization strategy is active until the pre-determined end condition applies. The method comprises checking periodically to detect whether the pre-determined end condition applies. In response to detecting that the end condition applies, the first prioritization strategy is activated. When the first prioritization strategy is activated, the vehicle returns to normal running conditions. The first load is thereafter not prioritized over the second load(s).

According to a further aspect of the present disclosure, in response to detecting that the pre-determined end condition does not apply, the method comprises setting a dynamic set-point for maximum power distribution for the at least one second load that does not have a pre-determined set-point, in dependence of the detected pre-defined operating condition, and limiting maximum distributed power to the second load to the dynamic set-point.

Thus, when detecting that the pre-determined end condition does not apply, the second load, that was previously de-rated/limited with a dynamic set-point, is provided with an updated dynamic set-point according to any new running conditions that may exist after checking for the pre-determined end condition.

According to a further aspect of the present disclosure, alternatively or additionally, after detecting that the pre-determined end condition does not apply, after a pre-determined time period again detecting whether the pre-determined end condition applies.

In this alternative or additional step, the step of detecting whether the pre-determined end condition applies is repeated after a pre-determined time.

According to a further aspect of the present disclosure, the pre-determined end condition is that the pre-determined operating condition no longer applies.

If the pre-determined end condition is that the pre-determined operating condition no longer applies, the second prioritization strategy is deactivated when the first load no longer requires prioritization, such as when the propulsion system no longer has an increased power demand.

According to a further aspect of the present disclosure, the pre-determined end condition is the expiry of a pre-determined time period from the start of the activation of the second prioritization strategy.

In this case, the first prioritization strategy is activated after a pre-determined time period, regardless of which operating conditions exists when the time period ends. As such, the vehicle resumes normal running and the first load is no longer prioritized over the second load(s).

The object is also achieved according to a second aspect of the present disclosure, wherein a control unit is configured to control distribution of electric power from an electric energy storage system to a first load and to at least one second load according to any of the steps described above.

The control unit is provided with processing capability and may be connected to sensors and measurement systems for determining operating conditions of the vehicle. The control unit further controls the distribution of power from the electric energy storage system to the first load and to the second load(s) and administers the de-rating/limiting of power to the second loads and the setting of pre-determined and dynamic set-points. In other words, the control unit controls the activation and the deactivation of the first and second prioritization strategies.

The control unit may also be connected to a computer readable medium having stored thereon a computer program, which comprises code to cause the control unit to execute the steps of the above-described method.

The object is also achieved according to a third aspect of the present disclosure, relating to a power system of an electrically powered vehicle. The power system comprises a control unit as described above, an electric energy storage system, at least two loads including a first load in the form of a propulsion system, and at least one second load, such as at least one auxiliary load, a thermal system, and/or a power take-off.

An electrically powered vehicle may further comprise the control unit and/or the power system according, as described above. Essentially any type of electrically powered vehicle may be equipped with the power system and/or the control unit disclosed herein. However, the focus of the present disclosure is heavy vehicles, such as trucks, buses and constructions vehicles. The electric energy storage system may be at least one battery, at least one fuel cell or a combination thereof.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION OF EXAMPLE EMBODIMENTS OF THE INVENTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figure 1:
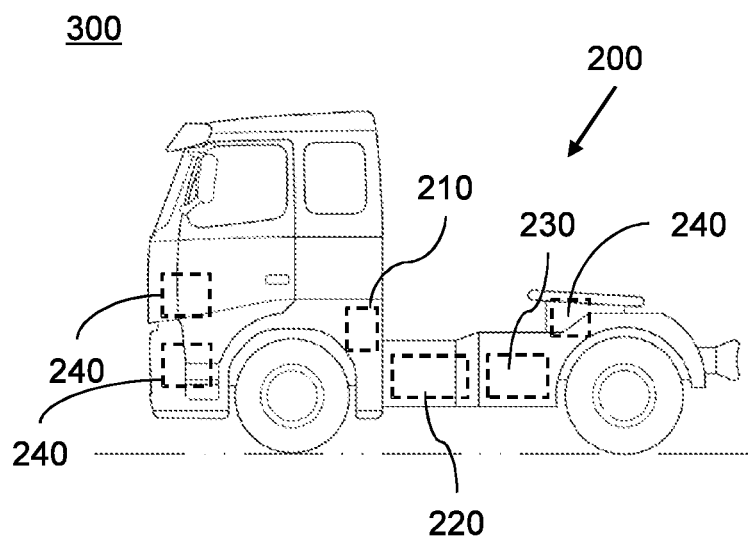
FIG. 1 shows a vehicle comprising the power system of the present disclosure.

FIG. 1 shows a side view of an electrically powered vehicle 300, comprising a control unit 210 and a power system 200. The control unit 210 is configured to control distribution of electric power from an electric energy storage system 220, such as at least one battery, to a first load 230 and to at least one second load 240. The first load 230 may be an electrical propulsion system of the vehicle and the at least one second load 240 may be an auxiliary load, such as a thermal system, and/or a power take-off of the vehicle. The second load may be connected to a traction voltage bus of the vehicle. As shown in FIG. 1, a plurality of second loads 240 may be connected simultaneously and consume varying amounts of power delivered by the electric energy storage system 220. There may be thermal systems for heating or cooling of a cab or of a cargo hold of the vehicle. Power take-offs, such as electrical apparatuses, machines and tools may also be connected. Power distribution to these systems, i.e. to the second loads, may need to be de-rated under certain pre-defined operating conditions, when the first load has an increased power demand and is required to perform reliably and without interruption.

Figure 2:
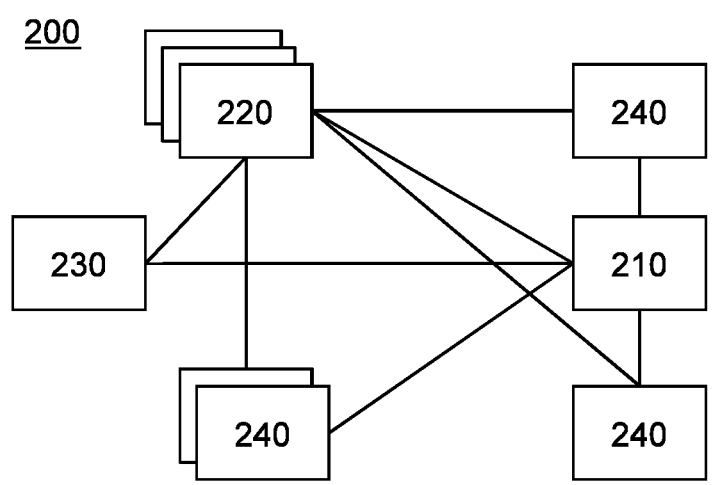
FIG. 2 shows a schematic view of the power system of FIG. 1.

As shown in FIG. 2, the control unit 210 is connected to the other parts of the power system 200 of the electrically powered vehicle 300. The control unit 210 controls the distribution of power from the electric energy storage system 220 to the first load 230 and to the second load(s) 240 in order to ensure smooth and reliable running of the first load 230, e.g. the electric propulsion system of the vehicle 300. The components of the power system 200 are further connected to and supplied by the same electric energy storage system 220, which is illustrated in FIG. 2 as a plurality of batteries and/or fuel cells.

To ensure that the first load 230 is provided with enough power in demanding situations, the control unit 210 manages de-rating/limiting of power to the second load(s) 240 such that power is reserved for the first load 230. To this end, the control unit 210 uses set-points, which determine a level of power that the electric energy storage system 220 may deliver to the second load 240 in question. Different second loads 240 may have different set-points. In addition, some set-points are pre-determined and set when the component (second load) is manufactured or installed in the vehicle 300. Other set-points are dynamic and are set in dependence of operating conditions. Such dynamic set-points may further be adjusted periodically during operation of the vehicle 300.

The electrically powered vehicle 300 runs by default, i.e. during standard operating conditions, in a first prioritization strategy of the control unit 210. However, in certain pre-determined operating conditions the control unit 210 is configured to activate a second prioritization strategy such that power distribution to the first load is prioritized over power distribution to the at least one second load. This method for power management of the electrically powered vehicle 300 will be described in detail hereinafter, referring to FIG. 3 and to FIG. 4.

Figure 3:
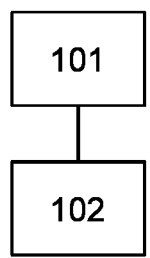
FIG. 3 shows flowchart a method according to a main aspect of the present disclosure.

FIG. 3 shows a main aspect of the method of power management of the electrically powered vehicle 300 of the present disclosure. At least two electrical loads 230, 240 are by default powered by the electric energy storage system 220 of the vehicle 300 according to the first prioritization strategy determining how power is distributed among the at least two loads 230, 240. The method comprises detecting 101 that a pre-defined operating condition applies, and in response to said detection, activating 102 a second prioritization strategy. In the second prioritization strategy, power distribution to the first load is prioritized over power distribution to the at least one second load.

As mentioned above, the pre-defined operating condition is a condition in which the first load 230 has an increased power demand, such as transient condition. Transient conditions may be situations where the vehicle 300 needs to start moving in an upwards slope, i.e. a hillstart, and/or start moving in cold weather. A further example of transient conditions is gearshifts, especially in combination with hill starts and/or cold weather. A low state of charge of the electric energy storage system 220 may also result in the first load 230, e.g. the propulsion system, demanding more power than currently delivered by the electric energy storage system 220.

Such operating conditions of increased power demand are usually known and may be pre-defined and detectable by the control unit 210 of the vehicle 300 in order to regulate power distribution from the electric energy storage system 220.

Figure 4:
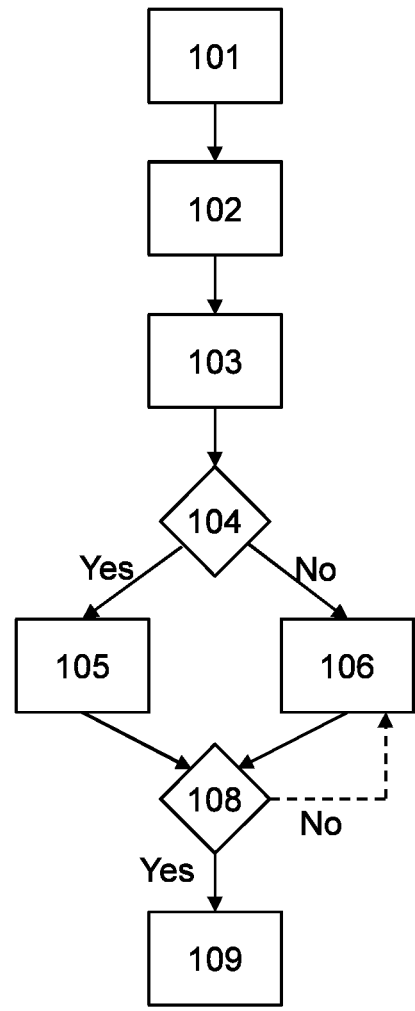
FIG. 4 shows a flowchart of a method according to the present disclosure.

As illustrated in FIG. 4, the method may further comprise, in the second prioritization strategy, limiting 103 distributed power to the at least one second load to a set-point for power distribution to said second load. The distributed power is thus limited to the second load(s) in a pre-determined manner when the pre-defined operating condition applies, such that more power is available for the first load. Power distribution to the first load in the second prioritization strategy is thereby prioritized under such pre-defined operating conditions.

In the second prioritization strategy, the method may further detect 104 whether the at least one second load 240 is provided with a pre-determined set-point for power distribution, and if such a pre-determined set-point is detected, limiting 105 distributed power to the at least one second load to the pre-determined set-point. The second load 240, e.g. an electric device or apparatus, may be installed in the vehicle with a pre-determined set-point for power distribution if continued operation of the device is necessary to avoid damaging it, or to avoid irreparable interruption of an ongoing process performed by the device. Thereby, the device may keep running during the second prioritization strategy, but at a limited level of power consumption. Accordingly, when a pre-determined set-point of a second load 240 is detected, the distributed power to that second load 240 is limited to that set-point so that the second load 240 is not allowed to consume more power than the pre-defined set-point.

If a pre-determined set-point is not detected, the method sets 106 a dynamic set-point for maximum power distribution for the at least one second load in dependence of the detected pre-defined operating condition, and limiting distributed maximum power to the second load to the dynamic set-point.

If the second load 240 performs non-critical operations, or it is not sensitive to temporary interruptions, it is not provided with a pre-determined set-point. Responses to temporary interruptions of such systems may be slow compared to the duration of an interruption caused by activation of the second prioritization strategy. An example of such a system is an air conditioning system of the cab of the vehicle, where the cab climate will not be noticeably changed by a temporary shut-down or decrease of the air conditioning system. Dynamic set-points may therefore be set for systems lacking a pre-defined set-point.

The dynamic set-points are set in accordance with the detected operating conditions. In harsh conditions, insensitive systems and operations may be de-rated/limited to zero maximum power, i.e. they may be shut down for the duration of the second prioritization strategy. In less harsh conditions, such systems may be allowed to keep running, but at a limited level of power consumption, as dictated by the control unit 210 according to the detected pre-defined operating condition.

Subsequently to activating the second prioritization strategy, the method detects 108 whether a pre-determined end condition applies. Detection that the end condition applies determines that the second prioritization strategy should terminate and the first prioritization strategy should be re-activated, i.e. that normal running of the vehicle 300 should resume. The second prioritization strategy is thus active until the pre-determined end condition applies.

The method comprises checking periodically whether the pre-determined end condition is detected 108. In response to detecting that the end condition applies, the first prioritization strategy is activated 109. The vehicle 300 returns normal/default running under the first prioritization strategy and the first load 230 is thereafter not prioritized over the second load(s) 240.

If the method detects that the pre-determined end condition does not apply, the method may periodically set 106 a dynamic set-point for maximum power distribution for the at least one second load 240 that does not have a pre-determined set-point, in dependence of the detected pre-defined operating condition, and limiting distributed maximum power to the second load to the dynamic set-point.

The dynamic set-point of this step is an updated dynamic set-point which is determined according to any new running conditions that may have arisen after a period of time since last checking for the pre-determined end condition.

Alternatively or additionally, after a pre-determined time period, the method may again detect 108 whether the pre-determined end condition applies. In this manner, the step of detecting whether the pre-determined end condition applies is repeated after a pre-determined time.

The pre-determined end condition may be that the pre-determined operating condition no longer applies. The first load 230, e.g. the propulsion system, therefore no longer has the increased power demand. In such a situation it may be determined that the second prioritization strategy is no longer needed and the first prioritization strategy is activated.

The pre-determined end condition may alternatively or additionally be the expiry of a pre-determined time period from the start of the activation of the second prioritization strategy.

In this case, the first prioritization strategy is activated after a pre-determined time period, regardless of which operating conditions exists when the time period ends. As such, the vehicle resumes normal running and the first load is no longer prioritized over the second load(s).

Figure 5:
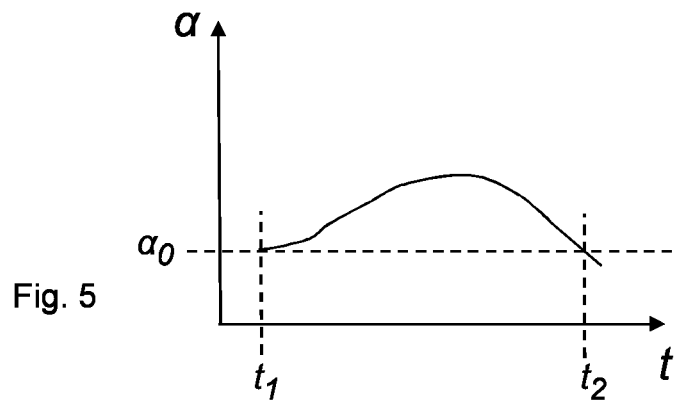
FIG. 5-7 show examples of prioritization strategy activation of the present disclosure.
Figure 6:
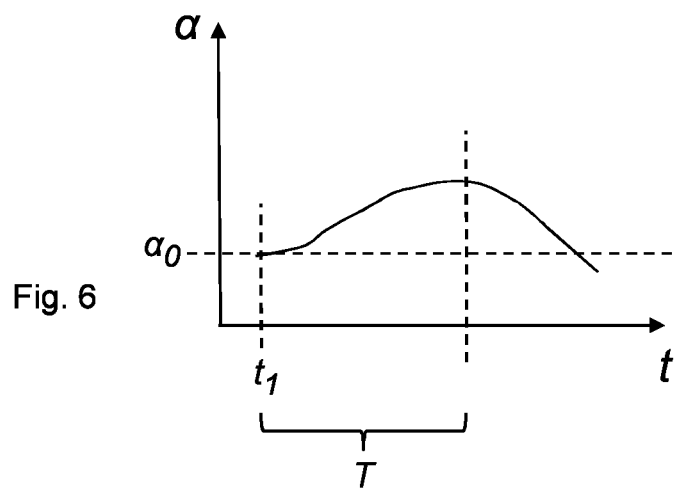
Figure 7:
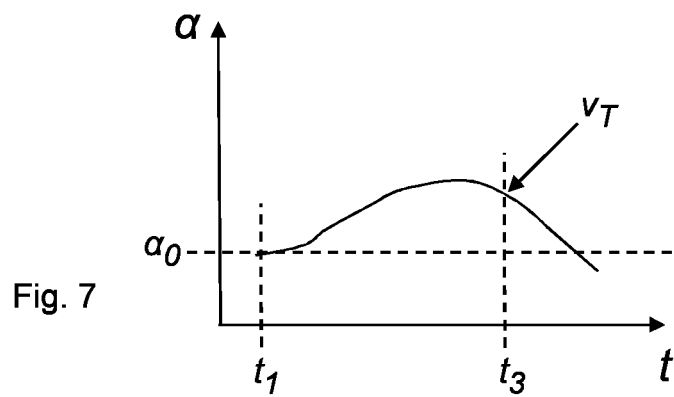

FIG. 5, FIG. 6 and FIG. 7. further illustrate three examples of how the activation of the prioritization strategies may be determined using threshold values detected by the control unit 210. The example scenario is a non-moving vehicle 300, under the first prioritization strategy, which is about to perform a hillstart. The graphs illustrate a vehicle/road inclination, a, detected by the control unit 210 as the vehicle 300 attempts to start moving at a time $t_1$. The control unit 210 detects 101 that a pre-defined operating condition applies, which in this example is a pre-determined threshold inclination $\alpha_0$, i.e. that the road/vehicle inclination $\alpha \geq \alpha_0$, meaning that the propulsion system may have an increased power demand. The second prioritization strategy is therefore activated 102 at $t_1$, to ensure that the vehicle 300 can start moving.

In FIG. 5, after periodically checking for a pre-determined end-condition, the pre-determined end condition is detected 108 at the time $t_2$. In this example, the pre-determined end condition is that the inclination $\alpha \leq \alpha_0$. An increased power demand is no longer deemed to exist at such an inclination. Additionally, in the illustrated scenario, the vehicle 300 is probably also moving at $t_2$. Therefore, the first prioritization strategy may be re-activated at $t_2$.

FIG. 6 illustrates an alternative method of re-activating the first prioritization strategy. Regardless of the magnitude of the road/vehicle inclination $\alpha$, the first prioritization strategy is activated after a pre-determined time T after activating the second prioritization strategy. The time T, may for instance be considered the maximum time that power distribution to the second load(s) 240 is allowed to be limited/de-rated.

FIG. 7 illustrates yet another example of re-activating the first prioritization strategy. In this case the pre-determined end condition is that a vehicle velocity $v \geq v_T$, which velocity is attained at the time $t_3$ after activating the second prioritization strategy. When the threshold velocity is attained, the propulsion system is no longer deemed to have an increased power demand even though the inclination is still greater than $\alpha_0$. The first prioritization strategy is therefore activated.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for power management of an electrically powered vehicle, wherein at least two electrical loads including a first electrical load, which is an electrical propulsion system of the vehicle, and a plurality of second electrical loads, which are an auxiliary load and/or a power take-off of the vehicle, are by default powered by an electric energy storage system of the vehicle according to a first prioritization strategy determining how power is distributed among the at least two loads, wherein the plurality of second electrical loads comprises a device that requires a certain power to operate correctly and a device that performs non-critical operations, or is not sensitive to temporary interruptions, the method comprising:

detecting that a pre-defined operating condition applies, the pre-defined operating condition is a condition in which the electrical propulsion system of the vehicle has an increased power demand due to a transient condition comprising hill starts, gearshifts, and/or starting during cold weather, resulting in a detected pre-defined operating condition, in response to said detection, activating a second prioritization strategy, wherein, according to the second prioritization strategy, power distribution to the first load is prioritized over power distribution to the plurality of second loads, wherein the device that requires the certain power to operate correctly is provided with a pre-determined set-point for power distribution such that the device is allowed to keep running during the second prioritization strategy, but at a limited level of power consumption, and wherein the device that performs non-critical operations, or is not sensitive to temporary interruptions, is not provided with a pre-determined set-point, wherein the second prioritization strategy comprises limiting distributed power to the device that requires the certain power to operate correctly to the predetermined set-point and limiting distributed maximum power to the device that performs non-critical operations, or is not sensitive to temporary interruptions, to a dynamic set-point, wherein the dynamic set-point is set in dependence of the detected pre-defined operating condition.

2. The method according to claim 1, further comprising, subsequently to activating the second prioritization strategy, detecting whether a pre-determined end condition applies.

3. The method according to claim 2, further comprising, in response to detecting that the pre-determined end condition applies, activating the first prioritization strategy.

4. The method according to claim 2, comprising, in response to detecting that the pre-determined end condition does not apply:

setting a dynamic set-point for maximum power distribution for the at least one second load that does not have a pre-determined set-point, in dependence of the detected pre-defined operating condition, and limiting maximum distributed power to the second load to the dynamic set-point, and/or after a pre-determined time period, detecting whether the pre-determined end condition applies.

5. The method according to claim 2, wherein the pre-determined end condition is that the pre-defined operating condition no longer applies.

6. The method according to claim 2, wherein the pre-determined end condition is the expiry of a pre-determined time period from the start of the activation of the second prioritization strategy.

7. A control unit configured to control distribution of electric power from the electric energy storage system to the first load and to the at least one second load according to the steps of claim 1.

8. A non-transitory computer readable medium having stored thereon a computer program causing a control unit to perform the method of claim 1 when executed.

9. A power system of an electrically powered vehicle, the power system comprising:

the control unit according to claim 7, the electric energy storage system, at least two loads including the first load in the form of a propulsion system, and the at least one second load, such as at least one auxiliary load.

10. An electrically powered vehicle comprising the control unit according to claim 7.

\* \* \* \* \*